United States Patent [19]

Rudy et al.

[11] 4,166,045
[45] Aug. 28, 1979

[54] PURIFICATION OF COMBUSTION CATALYSTS AND SOLID PROPELLANT COMPOSITIONS CONTAINING THE SAME

[75] Inventors: Thomas P. Rudy, Saratoga; Toshio W. Nakagawa, San Jose, both of Calif.

[73] Assignee: United Technologies Corporation, East Hartford, Conn.

[21] Appl. No.: 356,676

[22] Filed: May 2, 1973

[51] Int. Cl.² .............................................. B01D 15/06
[52] U.S. Cl. ................................. 252/414; 252/431 R; 252/438; 252/467; 252/472; 149/19.4; 149/42; 149/76; 149/109.6
[58] Field of Search ............ 149/109; 252/472, 431 R, 252/467, 438, 414

[56] References Cited

U.S. PATENT DOCUMENTS 3,533,959   10/1970   Miale et al. ........................... 252/414

Primary Examiner—Stephen J. Lechert, Jr.
Attorney, Agent, or Firm—Steven F. Stone

[57] ABSTRACT

Combustion catalysts for solid propellants are extracted with a solution comprising a solvent in which the catalyst is essentially insoluble and a solute which is an effective chelating agent for metal ions which are present as interfering impurities in the combustion catalysts. This treatment does not affect the activity of the catalyst as a combustion catalyst in a solid propellant; however, the removal of the metal ions greatly increases the pot life of the solid propellant composition prior to cure and enhances its stability after cure.

7 Claims, No Drawings

PURIFICATION OF COMBUSTION CATALYSTS AND SOLID PROPELLANT COMPOSITIONS CONTAINING THE SAME

BACKGROUND OF THE INVENTION

Composite solid propellants are generally formed by dispersing a solid particulate oxidizing agent in a cross-linkable polymeric binder. In addition to the oxidizing agent, it is conventional also to include various metallic fuel materials such as aluminum, boron or magnesium, for example, as well as high energy materials such as metal hydrides or explosives such as HMX and RDX, for example. In addition, when high burning rates are required, small amounts of combustion catalysts, particularly compounds of iron, chromium, copper and the transition elements such as: iron oxide; organoiron compounds such as ferrocene, mononuclear alkylferrocenes, and polynuclear ferrocene derivatives such as Hycat® and Catocene (available from Arapahoe Chemical Corp.); copper chromite; ferric ferrocyanide; and ferrous ferricyanide, to mention only a few of the well-known combustion catalysts; are added. After the particulate materials are thoroughly dispersed through the polymeric material, it is necessary to add a curing agent for the polymer to the mix to thoroughly distribute the same throughout the mass and then to cast the propellant into a suitable configuration. In this process, it is essential that adequate time be available in order to thoroughly disperse the curing agent throughout the polymeric mass and then cast the same before the viscosity of the mixture increases to the point at which it is no longer possible for the propellant mass to flow into the mold. A requirement therefore exists for a certain minimum pot life in most propellant casting operations during which the propellant containing the crosslinking agent must remain in a sufficiently fluid state. We have observed that propellant compositions containing the aforementioned combustion catalysts tend to have a substantially shorter pot life than similar compositions without these combustion catalysts and that, in many cases, these shorter pot lives effectively prevent the formulation of certain desirable compositions. We have also found that the undesirably low pot lives can be extended if the combustion catalysts are treated to remove therefrom certain trace impurities of ionic metals. It appears that these trace impurities of ionic metals are distinguished from the bulk of the metal content of the combustion catalyst by being present in a form which is soluble in the propellant binder. Therefore, the ionic metal impurities, hereinafter designated as "labile" metal ions, act as cure catalysts for the cure reaction of the propellant and are responsible for the undesirably short pot lives observed. When the treated combustion catalysts are used in the solid propellant formulations, the pot lives are extended to times approaching those observed when no combustion catalyst is employed, and there is no noticeable difference in the activity of the catalyst as a modifier of the combustion rate of the propellant.

It is accordingly an object of this invention to provide a method for treating combustion catalysts which removes therefrom trace labile ionic metal impurities.

It is another object of this invention to extend the pot life of solid propellant compositions containing combustion catalysts.

It is another object of this invention to provide a propellant composition containing a purified combustion catalyst.

These and other objects of this invention will be readily apparent from the following description.

DESCRIPTION OF THE INVENTION

Combustion catalysts for solid propellants which derive their activity from the presence of metals of the transition and post transition groups and subgroups, i.e. Groups I B, V B, VI B and VIII of the periodic chart, are purified prior to their introduction into the propellant mix. While many of the above metals are known to exhibit activity as combustion catalysts, in practice the only metals of important concern in propellant technology are chromium, iron and copper. Accordingly, the following discussion will be directed to catalysts containing these three metals; however, it is recognized that the invention as a whole is applicable to any metal species which is capable of exhibiting activity as a combustion catalyst and which in a labile ionic form is capable of catalyzing the cure action of the propellant binder system. Compositions of most concern with respect to this invention include iron oxide, ferric and ferrous ferri- and ferrocyanides, ferrocyanides and ferricyanides of other metals, ferrocene and ferrocene derivatives such as mononuclear alkylferrocenes, Hycat® and Catocene, copper chromite and ammonium chromite.

According to this invention, the combustion catalyst is extracted with a solution of a solvent in which the combustion catalyst is substantially insoluble and a solute which is an effective chelating agent for the metal ions which are present as interfering impurities in the combustion catalyst. A wide variety of chelating agents which can be usable according to this invention are known to the art and can be readily selected by a worker skilled in the art to meet the above guidelines concerning solubility of the combustion catalyst and the chelating agent.

Reference is made to "Chelating Agents and Metal Chelates," by F. P. Dwyer and D. P. Mellor, Academic Press, New York, 1964, Chapters 3, and 4, for a detailed discussion of the various chelating agents which may be used according to this invention. The following is a general list of suitable classes of chelating agents which are usable according to this invention:

A. Bidentate Chelating Agents Containing:
  1. Oxygen
     a. Oxyanions which form four-membered rings
     b. Alkanoate Ions
     c. Dicarboxylate Ions
     d. $\beta$-Diketones
     e. $\alpha$-Hydroxycarboxylic Acids
     f. o-Diphenols
     g. Salicylaldehyde
     h. Diols and Polyols
  2. Nitrogen
     a. Alkyl and Aryl Diamines
     b. Aromatic Heterocyclic Bases
     c. Other Nitrogen-Nitrogen Chelators
     d. Nitrogen-Oxygen Chelators
  3. Sulfur
     a. Chelators with Two Sulfur Atoms as Donors
     b. Sulfur-Oxygen Chelators
     c. Sulfur-Nitrogen Chelators
  4. Phosphorus and Arsenic Chelators
B. Multidentate Chelating Agents 1. Tridentate
    a. Planar
    b. Nonplanar
2. Quadridentate
    a. Closed Ring
    b. Open Chain
3. Quinquedentate 4. Sexadentate
5. Higher Multidentate The following examples are illustrative of this invention:

EXAMPLE 1

A solution consisting of 50 milliliters of HYCAT-6 combustion catalyst dissolved in 100 milliliters of petroleum ether was extracted in a separatory funnel with three successive 50 milliliter portions of a 5% by weight solution of the chelating agent identified below in water. The petroleum ether solution was then washed three times with water (50 milliliter portions), dried over anhydrous sodium sulfate and then freed of the petroleum ether in a rotating evaporator at approximately 60° C. and 2 torr pressure. Approximately 0.1% by weight of tertiary-butylhydroquinone, a known antioxidant, was added to the purified catalyst to protect it from atmospheric oxidation. The effectiveness of the catalyst purification method in extending binder pot life was demonstrated with the following gumstock formulation:

| Components | Amounts |
| --- | --- |
| Hydroxy terminated polybutadiene (Poly B-D R-45M) | 1.0 equivalent |
| Dimeryl diisocyanate (DDI) | 0.8 equivalent |
| Dioctyl adipate | 20% by weight |
| t-Butylhydroquinone | 0.7% by weight |
| Combustion catalyst | 14% by weight |

The effect of treatment of the combustion catalyst on the gel time for the above polymeric mixture was determined for each of three different chelating agents by comparing the gel time of a composition containing the treated combustion catalyst with the gel time of the same composition containing the untreated combustion catalyst. The results are set forth in the following table:

| Chelating Agent | Gel Time (hours at 60° C.) |
| --- | --- |
| None | 8.6 |
| Mercaptoacetic acid | 11.1 |
| None | 12.6 |
| Oxalic acid | 23.9 |
| None | 9.8 |
| Tetrasodium salt of ethylene-diaminetetraacetic acid (TSEDTA) | 19.4 |

EXAMPLE 2

Hycat and Catocene combustion catalysts were treated with oxalic acid and TSEDTA as described in Example 1 and formulated into propellant compositions according to the following formula:

| Component | Amount |
| --- | --- |
| Ammonium Perchlorate | 70% w |
| Aluminum | 16% w |
| Binder | 14% w |
| HTPB, 1.0 equivalent | |
| DDI curative, 0.8 equivalent | 11.8% w |
| Combustion catalyst | 2.0% w |
| t-Butylhydroquinone | 0.10% w |
| Dibenzoylmethane | 0.10% w |

The effect of the various chelating agents tested on the propellant properties are set forth in the following table:

| Catalyst | Chelating Agent | Propellant Fluidity at 140° F. gm/min* | | | | | | | Time to Discoloration of cured Propellant at 140° F., days |
| --- | --- | --- | --- | --- | --- | --- | --- | --- | --- |
| | | End of Mix | 1hr | 2hr | 3hr | 4hr | 5hr | 6hr | |
| HYCAT-6 | None | 7 | — | — | 5 | 6 | — | — | 12 |
| HYCAT-6 | Oxalic Acid | 17 | 20 | 22 | 21 | 23 | 19 | — | 20 |
| HYCAT-6 | TSEDTA | 15 | 16 | 16 | 15 | 14 | 13 | 13 | — |
| HYCAT-6 | Oxalic Acid | 18 | 18 | 18 | 18 | 16 | 14 | 13 | — |
| Catocene | None | 14 | 15 | 16 | 16 | 12 | — | — | — |
| Catocene | Oxalic Acid | 21 | 19 | 18 | 18 | 17 | 16 | 14 | — |

*A fluidity of about 8 gm/min is considered to be the minimum for practical casting of a propellant.

EXAMPLE 3

The utility of the purification process of this invention with inorganic combustion catalyst was demonstrated by stirring 25 gms of iron oxide in a solution of 1.0 g of tetrakis-(salicylideniminomethyl)methane in 1 liter of benzene at 60° C. The mixture was maintained at 60° C. and stirred occasionally for 3 days. The mixture was cooled to room temperature and the iron oxide removed by filtration was washed exhaustively with benzene and dried overnight at 100° C. The iron oxide so treated was compared with untreated iron oxide in the following propellant formulation:

| Component | Amount |
| --- | --- |
| Ammonium Perchlorate | 69.00% w |
| Aluminum | 16.00% w |
| Iron Oxide | 1.00% w |
| Binder | 14.00% w |
| HTPB (Poly B-D R-45M) | 12.98% w |
| IPDI (isophorone diisocyanate) | 0.89% w |
| AO-2246 [2,2-methylenebis-(4-methyl-6-t-butylphenol)] | 0.13% w |

The propellant formulation was mixed at 145° F. and the fluidity of the mixed propellant at 145° F. was measured periodically until the flow rate diminished to 8 gm/min which is the experimental value corresponding to the lower practical limit of castability. In a control formulation using untreated iron oxide, the pot life was one hour. When the iron oxide component of the formulation was treated as described above, the pot life was 2 hours.

Although this invention has been described with respect to several embodiments thereof, it should not be construed as being limited thereto. Various modifications may be made by workers skilled in the art without departing from the scope of this invention which is limited only by the following claims wherein:

We claim:

1. A method for purifying a composite solid propellant combustion catalyst consisting of a composition of a metal selected from the group consisting of metals of Group I B, V B, VI B and VIII of the periodic chart, in which composition the metal component accounting for the catalytic activity is present predominately in nonlabile form with minor amounts of metal in a labile ionic form as an impurity; which method comprises removing the labile ionic form of said metal by:

(a) extracting said catalyst with a solution comprising (i) a solvent in which the nonlabile metal portion of said catalyst composition is insoluble, and (ii) a solute which is a chelating agent for the labile ionic metal impurities of said catalyst, and (b) separating said purified catalyst from said solution.

2. The method of claim 1 wherein said metal is selected from the group consisting of chromium, iron and copper.

3. The method of claim 1 wherein said metal is iron.

4. The method of claim 1 wherein said metal is chromium.

5. The method of claim 1 wherein said metal is copper.

6. The method of claim 3 wherein said combustion catalyst is an organo-iron compound and the chelating agent is selected from the group consisting of mercaptoacetic acid, oxalic acid and the tetrasodium salt of ethylenediaminetetraacetic acid.

7. The method of claim 3 wherein said combustion catalyst is an inorganic-iron compound and the chelating agent is tetrakis-(salicylideniminomethyl)methane.

* * * * *